UNITED STATES PATENT OFFICE.

LEONHARD PINK, OF BERLIN, GERMANY; JOSEPH SIMSON, ATTORNEY IN FACT, ASSIGNOR TO SAID JOSEPH SIMSON, INDIVIDUALLY.

METHOD OF MANUFACTURING JOINTLESS FACINGS OF FLOORS, WALLS, AND THE LIKE.

1,019,083.     Specification of Letters Patent.     Patented Mar. 5, 1912.

No Drawing.     Application filed March 4, 1910. Serial No. 547,201.

*To all whom it may concern:*

Be it known that I, LEONHARD PINK, a subject of the German Emperor, and residing at Berlin, Germany, have invented a certain new and useful Improved Method of Manufacturing Jointless Facings of Floors, Walls, and the Like, of which the following is a specification.

The subject matter of this invention is an improved process of manufacturing plastic flooring, the invention relating more particularly to the making of jointless facings for floor surfaces, walls, and the like.

As is well known, artificial plastic masses for flooring are usually rather porous and even the most dense plastic compositions remain highly hygroscopic, which condition renders the floor or wall covering formed therefrom liable to change with climatic conditions and become distorted to such an extent as to crack and become otherwise impaired. For remedying this defect, by acting upon any unused magnesia it has been proposed to add various agents to the mass, but the mass thus obtained became hard too rapidly. It has also been proposed to add fats of various kinds for water-proofing.

The present invention is designed to overcome defects by adding to a mass composed of burned magnesite, magnesium chlorid lye and a filling agent, an inorganic acid and oleic acid and I prefer that the inorganic acid employed shall be phosphoric acid.

It has been found that oleic acid penetrates the pores of the filling material, displaces excess of chlorid and forms an agent of expansion. The agents, usually acids, proposed hitherto act to neutralize any magnesite or calcium carbonate which may be present in the magnesia. It has also been found that such carbonates, if present, cause movement in the sense of waves of expansion throughout the mass. This movement I cannot explain with certainty, but attribute it to the $CO_2$ present having a catalytic action involving the absorption in some degree of $CO_2$ from the air. This, in time, replaces the acid in the oxy-chlorid combination and the constant formation of magnesium carbonate thus effected results in the gradual expansion of the mass and cracking of the surface. It has also been found that phosphoric acid in the relation indicated is more effective than any other inorganic acid. It forms calcic phosphate which drives the carbonic acid from the magnesium or calcium base allowing it to escape as such without causing the mass to swell or to shrink; it is also insoluble and finally has a poisonous or at least a deterrent effect upon insects and bacilli. It is slightly hygroscopic and to overcome this objection, I prefer to incorporate in the mass a small quantity of oleic acid which latter fills the pores of the mass, effectually excluding moisture, and acts as a retarder during the setting; the oleic acid also imparts a degree of elasticity and flexibility. I prefer the oleic acid for this purpose to a fat for the reason that the latter, I have found, has a tendency to saponify and the soap thus formed prevents the formation of the phosphate indicated while the glycerin therein is water-soluble and otherwise objectionable. Other fatty acids are inferior to oleic for various physical reasons, and the result is not as elastic and suitable for the purpose intended by this invention. These inorganic acids, therefore, kill any life or movement of this kind in the magnesite to which the defects mentioned above are attributable. The usual filling agents are mixed in.

I claim:—

1. The herein described method of manufacturing jointless facings for floors, walls and the like, consisting in the mixing of magnesia, magnesium chlorid, a filling agent, oleic acid, and an inorganic acid, applying the mixture and shaping to form a facing for a floor or wall.

2. The herein described method of manufacturing jointless facings for floors, walls and the like, consisting in the mixing of burned magnesite, magnesium chlorid, a filling agent, oleic acid, and phosphoric acid, applying the mixture and shaping to form a facing for a floor or wall.

In testimony whereof, I affix my signature in the presence of two witnesses.

LEONHARD PINK.

Witnesses:
   WOLDEMAR HAUPT,
   HENRY HASPER.